United States Patent [19]
Younger

[11] 3,856,388
[45] Dec. 24, 1974

[54] OUTDOOR DRIVE-IN THEATER

[75] Inventor: Reat R. Younger, Springfield, Mo.

[73] Assignee: United States T.R.A.D. Corporation, Springfield, Mo.

[22] Filed: July 19, 1973

[21] Appl. No.: 380,708

[52] U.S. Cl............... 352/40, 352/133, 353/82
[51] Int. Cl. ............................................ G03b 21/32
[58] Field of Search ......... 352/40, 93, 94, 133, 134; 353/82

[56] References Cited
UNITED STATES PATENTS
2,779,237   1/1957   Smith............................ 352/104 X

*Primary Examiner*—Monroe H. Hayes
*Attorney, Agent, or Firm*—Lowe, Kokjer, Kircher, Wharton & Bowman

[57] ABSTRACT

A projected image upon leaving a motion picture projector is converted into groups of discrete images. A lens is provided for each discrete image to be projected upon a screen with the groups of discrete images being created by the various lenses having different focal lengths. A unique lens cluster board independently supports the lenses in their respective groups. By utilizing the cluster board and associated support, the viewing screens may be located at different distances from the projector, these distances being related to the focal lengths of the different lens groupings. Accordingly, a greater number of vehicles may view a motion picture in a drive-in theater using individual car viewing screens located at different distances from the projector.

2 Claims, 5 Drawing Figures

OUTDOOR DRIVE-IN THEATER

BACKGROUND AND BRIEF DESCRIPTION OF THE INVENTION

This invention relates to an improvement in outdoor drive-in theaters having a motion picture projector and individual car screens. At the present time, these theaters use a single projector to project an image through a separate lens for each car screen thereby forming discrete images with each discrete image transmitted through its own series of reflectors until directed to the screen. The screens are disposed in a circle about the projector in a projection house. In this manner, the number of screens in the drive-in theater depends upon the distance from the projection house, the focal length of each lens, and the width of a car (determining the size of screen used). From a practical standpoint, since the width of a car remains approximately the same, the number of screens actually depends on the focal lengths of the lenses. Accordingly, known prior art rear surface individual screen theaters limit the maximum number of viewers of the motion picture as dictated by the focal lengths of the lenses and now permits only one circle of screens around the projection house.

The subject invention comprises a projector, a multiple level lens cluster board, and viewing surfaces. The lens cluster board supports a lens for each viewing surface (each lens being supported independently of all other lens) and the lenses are grouped according to their focal length on the separate levels. The viewing surfaces may be concentrically positioned in a preselected manner relative to the projection house with the distance between each projection surface grouping being dependent on the difference between the focal lengths of the aforementioned lens groupings. Upon projecting an image from the projector, the lenses supported by the lens cluster board will create a discrete image for each viewing surface with the surfaces being grouped and located in relation to the focal lengths of the respective lenses.

An improved rack assembly for supporting a lens cluster board relative to the projector apparatus is shown in the copending application by Tom F. Smith, entitled "RACK ASSEMBLY", filed Mar. 5, 1973, and bearing Ser. No. 338,318.

One of the primary objects of the present invention is to provide a unique lens cluster board used in a drive-in theater. It is a feature of the invention that the lenses supported thereon create discrete images from a single projected image and that the board groups the lenses according to preselected focal length.

Another object of the present invention is to provide a unique lens cluster board of the character described that independently supports each lens to permit relative focusing of the discrete image on its viewing surface.

A further object of the present invention is to provide a unique drive-in theater using individual car screens arranged in multiple groupings and with said screens being positioned concentrically of the projection house. It is a further feature of the invention that the distance between the screen groupings are dependent upon the difference between the focal lengths of certain lens groupings.

A further object of the present invention is to provide a unique method of projecting discrete images on ground surfaces that are spaced at varied distances from the projector. Further it is a feature of this method that the spacing of the surfaces are related to the focal length of the lenses creating the discrete images.

These and other objects of the invention, together with the features of novelty appurtenant thereto, will appear in the course of the following description.

DETAILED DESCRIPTION OF THE INVENTION

In the accompanying drawings which form a part of this application and are to be read in conjunction therewith, and in which like reference numerals are employed to indicate like parts in various views.

Figure 1:
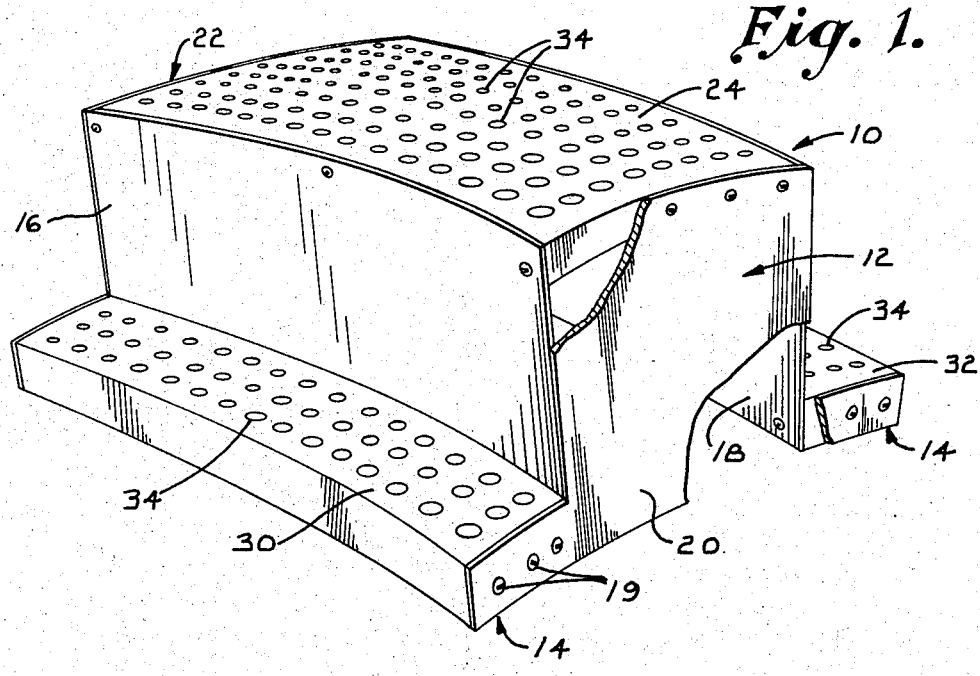
FIG. 1 is a perspective view showing one form of a lens cluster board embodying the present invention with certain portions thereof broken away for illustration purposes.

Turning now to the drawings, FIG. 1 depicts a lens cluster board 10 generally illustrated as having a box-like shape 12 with flanges 14 extending along the outside, lower end portions thereof. Box-like shape 12 is formed, in part, by side plates 16 and 18 and by end plates 20 and 22. The various plates are shown as attached by screws 19 or otherwise fastened to the cluster board surfaces 24, 30 and 32 to form the unitary rigid structure. In any event, upper board surface 24 encloses only the central upper surface of the box 12 while the lower and opposite surface thereof is left open. As illustrated, flanges 14 extend transversely from sides 16 and 18 respectively. In a similar manner, lower cluster board surfaces 30 and 32 are fixedly held in place by screws 19 located in oppositely oriented flanges 14. Actually, all cluster board surfaces are constructed as a segment of an arc (see FIGS. 1 and 3) for purposes which will be explained in greater detail hereinafter.

Figure 2:
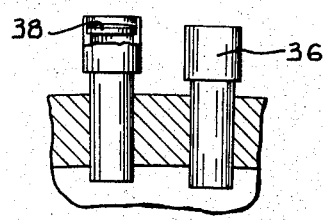
FIG. 2 is an enlarged elevational view of a lens tube with certain portions being in section.

In order to facilitate the location of the lens holder tubes 36, holes 34 are drilled in upper cluster board surface 24 as well as in the lower sides of boards 30 and 32. In actual practice, there will be one hole for every discrete image to be provided and the axis of each hole will be oriented to converge at the aperture of a projector, (see FIG. 3). Lens tubes 36 (which are constructed substantially similar to the tubes disclosed in the Smith application, supra, with each one having a lens 38 positioned therein) are slidably supported within holes 34 (FIG. 2) to permit relative focusing of each discrete image. Further, upper surface 24 and side surfaces 30 and 32 are formed in the suggested arcuate shape to keep the length of tubes 35 to a minimum. Since the focal length of lenses 38 in upper surface 24 will be different from lenses 38 in lower side surfaces 30 and 32, the distance between upper surfaces 24 and lower surfaces 30 and 32 will reflect this difference in focal length. For example, if the focal length of lenses 38 in surfaces 30 and 32 is 28 inches, then upper surface 24 would be 4 inches above surfaces 30 and 32.

Figure 3:
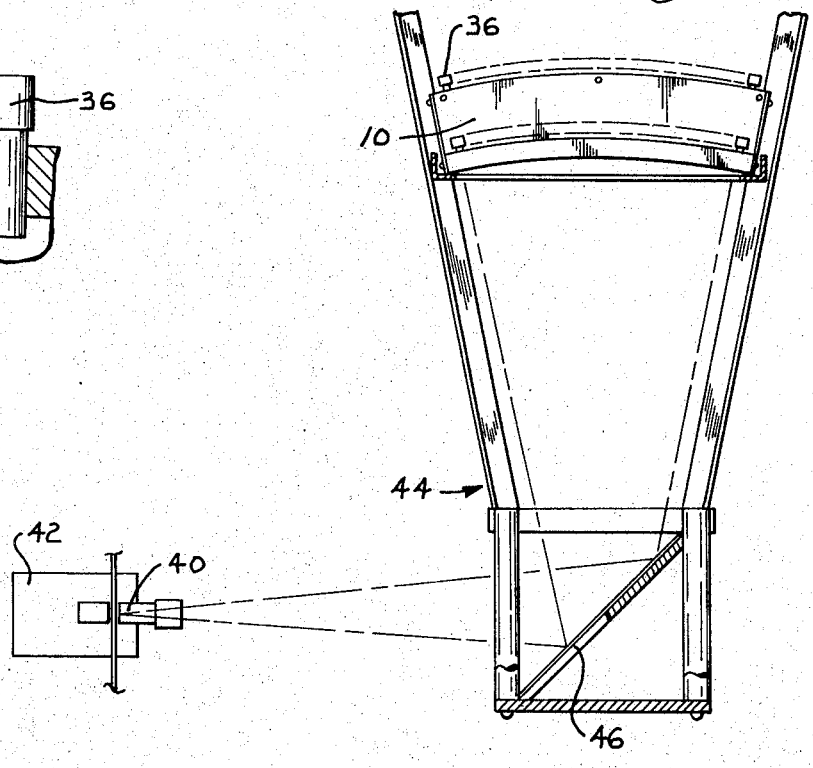
FIG. 3 is an elevational view of the lens cluster board of FIG. 1 being supported relative to a projector.

As shown in FIG. 3, a motion picture projector 40 is positioned within a projection house 42. A rack assembly 44 supports a conventional horizontal-vertical mirror 46 and cluster board 10 relative to projector 40. Continuing with the above example, lenses 38 supported by lower boards 30 and 32 would be 28 inches from projector 40 via the reflection from mirror 46. The discrete images created by cluster board 10 would pass on to additional mirrors (not shown) and directed to the viewing screens, as described in U.S. Pat. No. 2,779,237, issued to Tom F. Smith and in the copending Smith application mentioned above.

Figure 4:
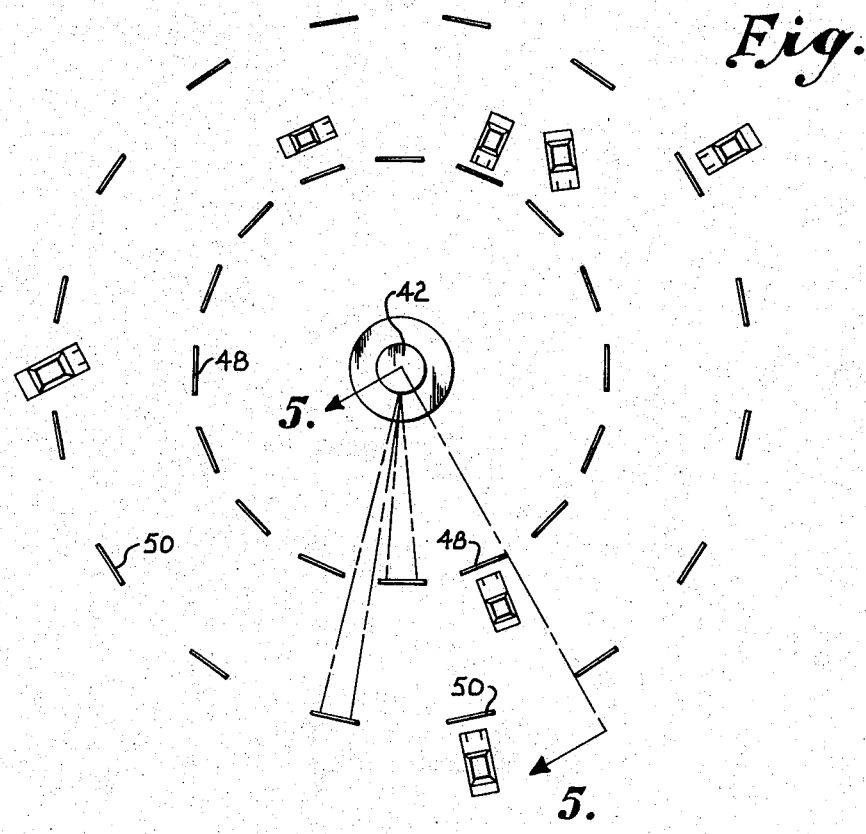
FIG. 4 is a plan view of a drive-in theater embodying the present invention.
Figure 5:
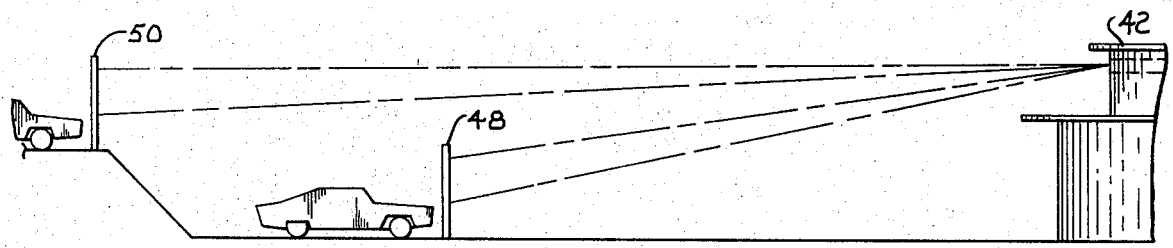
FIG. 5 is a partial enlarged side elevational view of the drive-in theater illustrated in FIG. 4, taken along line 5—5.

As best seen in FIGS. 4 and 5, the individual viewing screens 48 and 50 are disposed in a concentric generally circular fashion about projection house 41. The distance between screens 48 and 50 is a function of the different focal lengths of lenses 38 supported by upper surface 24 and lower surfaces 30 and 32. An important consideration concerning the distance between screens 48 and 50 is the ready movement of cars into and out of the viewing area and as a result this consideration assists in the determination of the focal lengths of lenses 38. Furthermore, since the discrete images may leave projection house 42 at the same level but be reflected at different angles, screens 50 may be positioned at a higher level than screens 48, (see FIG. 5). However, screens 48 and 50 may be disposed at approximately the same elevation with additional mirrors (not shown) adjusted to direct the discrete images to the outer screens 50, and insuring the cars will not interfere with these discrete images by providing sufficient space between screens 48 and 50.

In operation, projection house 42 having projector 40 positioned therein is located at the desired location for the drive-in theater. The first group of viewing surfaces, screens 48, are then positioned in a circle about projection house 42, the radius of the circle being determined by the focal length of the first group of lenses 38 supported by the lower surfaces 30 and 32 of the cluster board 10. A second group of viewing surfaces (screens 50) are then positioned in a circle about projection house 42, the radius of this circle being determined by the focal length of the second group of lenses 38 supported by upper board 24. Accordingly, the distance between screens 48 and 50 corresponds directly to the difference in the focal length between lenses 38 in upper board 24 and lower boards 30 and 32.

From the foregoing, it will be seen that this invention is one well adapted to attain all the ends and objects herein set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. An apparatus for projecting a plurality of images from a projected image onto at least two spaced groups of discrete viewing surfaces, said apparatus comprising a projector means for projecting an image, a first group of lens means, said first group being positioned to receive said projected image and to convert said projected image into discrete images for focusing on one group of said viewing surfaces, a second group of lens means, said second group being positioned to receive said projected image and to convert said projected image into discrete images for focusing on the other group of said viewing surfaces, and a cluster board having at least two surfaces spaced from one another and from said projector means, one of said board surfaces operable to support said first group of lens means, the other of said board surfaces operable to support said second group of lens means, the distance separating said board surfaces corresponding to the differences between said focal lengths of said lens groups.

2. The combination as in claim 1 including means for supporting each lens in each group independently of all other lenses, said supporting means thereby permitting relative focusing of each of said lens.

* * * * *